United States Patent [19]

d'Alayer de Costemor d'Arc

[11] Patent Number: 4,701,899

[45] Date of Patent: Oct. 20, 1987

[54] SWINGING RECORD CHANGER

[75] Inventor: Stephane d'Alayer de Costemor d'Arc, Brussels, Belgium

[73] Assignee: Staar S.A., Brussels, Belgium

[21] Appl. No.: 900,890

[22] Filed: Aug. 27, 1986

[30] Foreign Application Priority Data

Sep. 12, 1985 [BE] Belgium ............................ 215574
May 14, 1986 [BE] Belgium ............................ 216659

[51] Int. Cl.⁴ .................. G11B 17/26; G11B 17/28; G11B 17/30
[52] U.S. Cl. ............................ 369/36; 198/435; 369/38; 369/39; 414/331
[58] Field of Search .............. 369/36, 37, 38, 39; 198/435; 414/331, 787

[56] References Cited

U.S. PATENT DOCUMENTS

| | | | |
|---|---|---|---|
| 2,839,305 | 6/1958 | Andres | 369/37 |
| 2,850,285 | 9/1958 | Vanderzee | 369/37 |
| 3,085,805 | 4/1963 | Bodenroder | 369/39 |
| 3,272,307 | 9/1966 | Waite | 198/435 |
| 4,016,969 | 4/1977 | Brand | 198/435 |
| 4,284,187 | 8/1981 | Kramer | 198/435 |
| 4,510,591 | 4/1985 | Schatteman | 369/77.1 |
| 4,513,409 | 4/1985 | Staar | 369/77.1 |
| 4,570,194 | 12/1986 | Schatteman | 369/97 |
| 4,633,452 | 12/1986 | Shimbo | 369/39 |

Primary Examiner—Steven L. Stephan
Attorney, Agent, or Firm—Leydig, Voit & Mayer

[57] ABSTRACT

Record changing apparatus for the successive and/or selective reproduction and/or recording of records having a magazine for storing records and a loading/reproducing mechanism for receiving the records, the loading/reproducing mechanism and the magazine both being mounted for pivoting about distinct parallel axes and being driven and coordinated to provide opposite angular displacements between a plurality of fixed positions in each of which a compartment in the magazine faces the loading/reproducing mechanism for transfer of a record therebetween.

16 Claims, 11 Drawing Figures

SWINGING RECORD CHANGER

TECHNICAL FIELD

The present invention relates to apparatus for the successive and/or selective reproduction and/or recording of information on carriers contained in a magazine and, more particularly, to such apparatus, commonly called "record changers", where the information carriers are record discs.

BACKGROUND ART

Known record changers are of two general types, i.e., rotary or linear. In both types, either the mechanism for the loading and reproduction of the information on the record is fixed and the magazine is movable or the magazine is fixed and the loading/reproduction mechanism for the record is movable.

Although changers of the rotary type are particularly well suited to apparatus having magazines for storing a large number of records, linear changers in which the magazine is movable are preferred for reasons of space where the number of records stored in the magazine is moderate (for example, ten to twenty records). Linear-type changers in which the loading/reproduction mechanism is movable have not been extensively used commercially because the precise displacement of this mechanism requires complicated components which have proved very expensive and not very reliable.

Linear-type changers in which the magazine is movable have only had a limited success because, in order to remain compact and, in particular, to meet the standards laid down for home equipment, they cannot contain more than six to seven records or cassettes. This capacity is too low to really justify a changer. Based on commercial and practical considerations, therefore, it is when a record changer is capable of storing more than ten records that a changer becomes justified.

DISCLOSURE OF THE INVENTION

The principal object of the present invention is to provide a changer having a high-capacity magazine for storage of records while being less bulky than those hitherto proposed.

Another object of this invention is to provide an extremely simple changer, permitting easy and, therefore, economical mass production.

With a view to achieving these objects, apparatus embodying the present invention employs a mechanism for loading/reproducing records and a magazine, both of which are movable and being mounted for pivoting about two distinct axes and both of which effect opposite angular displacements in a coordinated manner to be positioned for transfer of a record between the magazine and the loading/reproducing mechanism.

BRIEF DESCRIPTION OF THE DRAWINGS

Further objects and advantages of the invention will be apparent from the following description taken with reference to the drawings, in which:

FIG. 8 is a top plan view similar to FIG. 6 except FIG. 6 shows the components when the records are in the magazine and FIG. 8 shows the components with a record in operating position in the loading/reproducing mechanism.

BEST MODE FOR CARRYING OUT THE INVENTION

Figure 1:
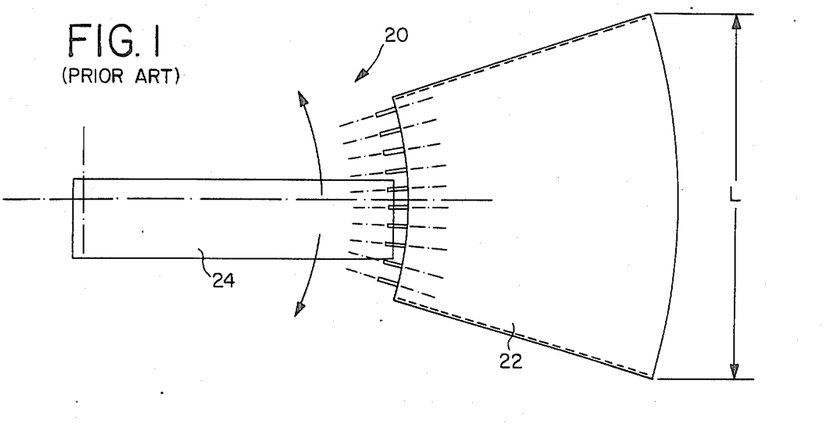
FIGS. 1 and 2 diagrammatically represent changer apparatus of known type.

FIG. 1 diagrammatically illustrates a record changer 20 of the rotary type having a fixed magazine 22 for storing records and having a loading/reproducing mechanism 24 mounted for rotary movement. Due to the diverging sides of the magazine 22, necessary in order to position the records in alignment with the loading/reproducing mechanism 24 as it swivels, the minimum required width dimension of the apparatus is defined by the dimension L.

Figure 2:
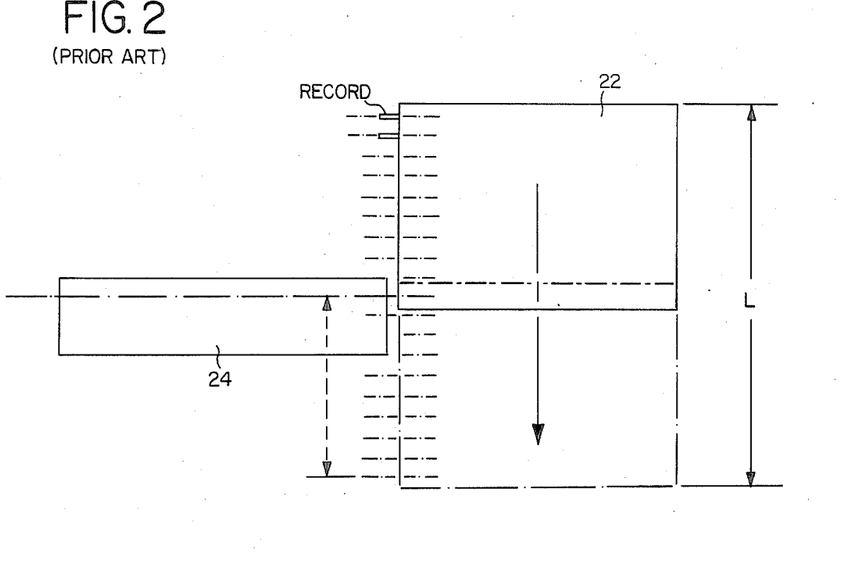

FIG. 2 illustrates a record changer of the linear type having a movable magazine 22 containing records and a fixed loading/reproducing mechanism 24. The magazine 22, illustrated in solid lines, is positioned so that the record contained in its first compartment is facing the loading/reproducing mechanism 24. The position occupied by the magazine 22 when its last compartment is facing the loading/reproducing mechanism 24 is illustrated in dotted lines. The distance L represents the necessary minimum width of the changer or minimum height of the changer if the magazine is mounted for vertical movement.

Figure 3:
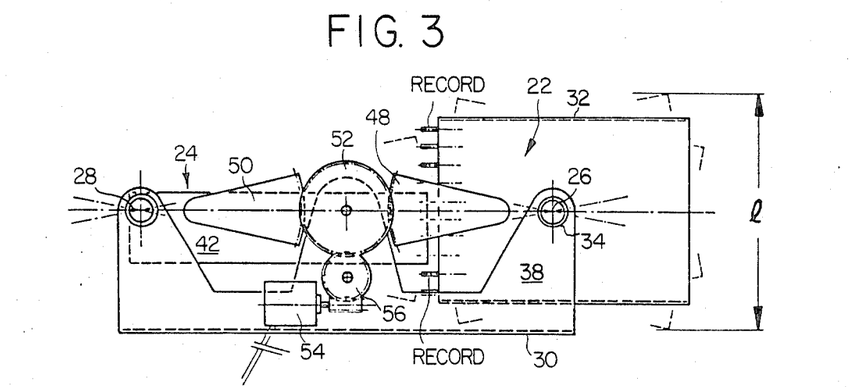
FIG. 3 is a diagrammatic side view of a changer apparatus according to the invention.
Figure 4:
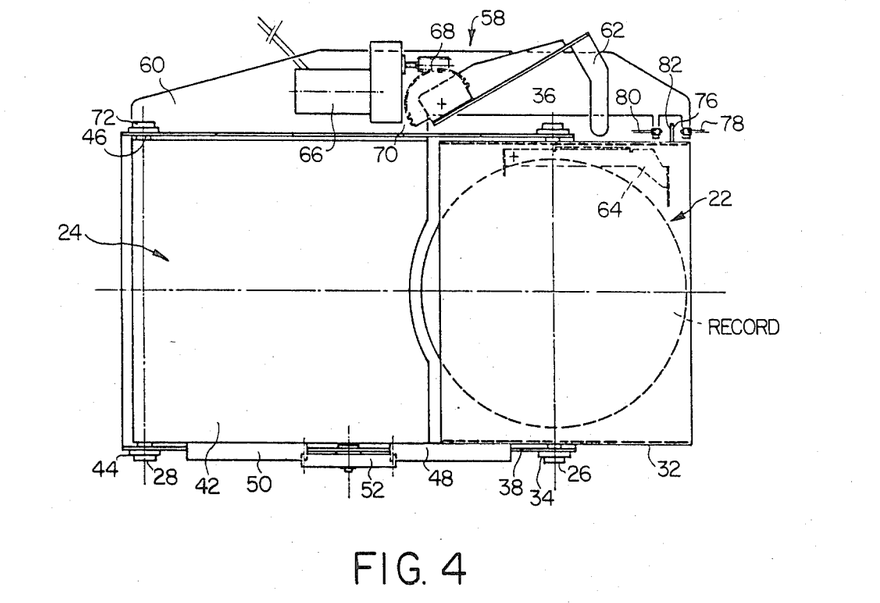
FIG. 4 is a diagrammatic plan view of the changer apparatus shown in FIG. 3.
Figure 5:
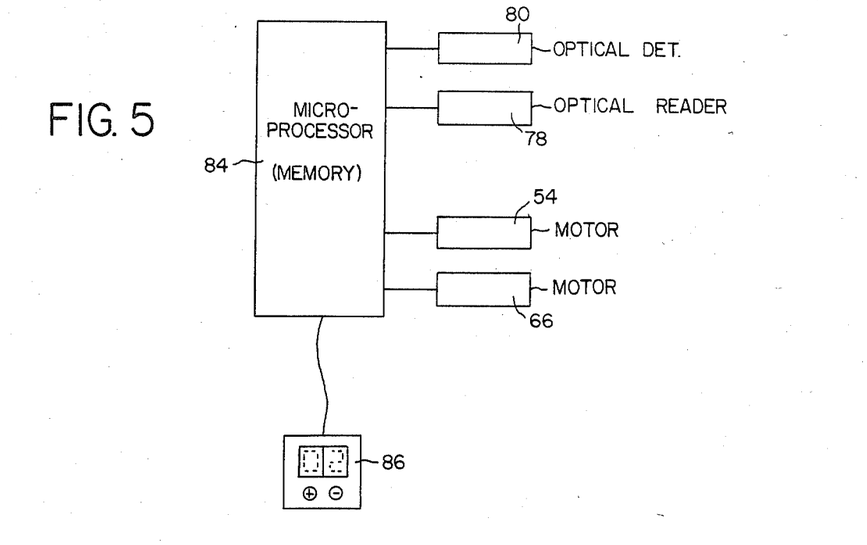
FIG. 5 is a schematic circuit diagram of a control system for the changer apparatus of this invention.

FIGS. 3-5:

Referring now to FIG. 3, which diagrammatically illustrates a record changer according to the invention, a magazine 22 is provided for storing records, and a loading/reproducing mechanism 24 is provided for receiving a selected record from the magazine 22 and reproducing information recorded thereon.

In carrying out the invention, the magazine 22 and the loading/reproducing mechanism 24 are both mounted for pivoting about two horizontal axes 26, 28, respectively, and are carried by a fixed frame 30. It is preferred that the magazine 22 be removable from the record changer, and, for this purpose, the magazine 22 is held in a open-ended box-like housing 32 having laterally-extending sleeves 34, 36 which are rotatably supported on vertical side members 38, 40 of the frame, allowing the magazine to pivot about the horizontal axis 26 which is also the axis of the sleeves 34, 36.

The loading/reproducing mechanism 24 is carried by a movable frame or chassis 42 which is pivotally supported about the horizontal axis 28. The movable chassis 42 has laterally-extending sleeves 44, 46 rotatably supported on the opposite side members 38, 40 of the fixed frame 30. It will be noted that the magazine 22 is box-shaped and is supported for movement about its geometrical center and is thereby balanced about the supporting axis, while the movable chassis 42 carrying the loading/reproducing mechanism is supported about an axis 28 at the end of the chassis 42 remote from the magazine. Since the magazine 22 is bulkier than the loading/reproducing mechanism 24, the support of the magazine at a geometrical center, by minimizing the extent of lateral movement of the magazine 22 as it swivels when shifted to locate a record compartment for transfer to the loading/reproducing mechanism, results in a record changer which has smaller overall height (l) than the height (L) of conventional record changers with the same capacity magazine, an important objective of the invention.

For the purpose of imparting pivotal movement to the magazine 22 and the loading/reproducing mechanism 24, both the magazine housing 32 and the movable chassis 42 for the loading/reproducing mechanism 24 have toothed members, herein shown as segments 48, 50, fastened thereto, the segments 48, 50 having gear teeth which mesh with a common drive gear 52 that moves both the magazine 22 and loading/reproducing mechanism 24 in a pivotal manner to produce coordinated angular displacements thereof about their respective axes 26, 28 between different fixed positions. The drive gear 52 is operated by a motor 54 through a reduction gear train 56.

In accordance with the invention, the magazine 22 and loading/reproducing mechanism 24 are movable between a series of fixed positions, and, in each fixed position, one of the compartments in the magazine 22 faces the loading/reproducing mechanism to permit a record to be transferred from the compartment to the mechanism or vice versa. In each compartment means is provided for storing a record in a storage plane P1 while in the loading/reproducing mechanism a support is provided for receiving a record in a loading plane P2.

Accordingly, the rotation of the drive motor 54 in clockwise or counterclockwise direction pivots the magazine 22 and the loading/reproducing mechanism 24 about their respective axes 26, 28. According to the invention, the pivotal displacements are coordinated and take place in opposite directions to align the storage plane P1 of a different one of the compartments with the loading plane P2 of the loading/reproducing mechanism at each of the fixed positions.

The two extreme positions of the changer, with the first or last compartment of the magazine 22 facing the loading/reproducing mechanism 24 and the storage plane P1 and the loading plane P2 aligned, are illustrated in dashed lines in FIG. 3. It will be noted that the height dimension (l) required for this changer is much less than that (L) of the two known changers illustrated in FIGS. 1 and 2. More precisely, the height dimension l required for the same number of compartments is much shorter than the corresponding dimension L required for either the rotary-type changer of FIG. 1 or the linear-type changer of FIG. 2.

For the purpose of transferring a record from any selected compartment in the magazine 22, a transfer mechanism 58 is mounted on the movable chassis 42 carrying the loading/reproducing mechanism being carried by a lateral extension 60 of the chassis 42. This transfer mechanism 58 is operable to transfer a selected record between its position of rest in a compartment of the magazine 22 and its loading position in the loading-/reproducing mechanism 24. In the preferred embodiment illustrated, the transfer mechanism includes a lever member 62 which is pivotally mounted on the lateral extension 60 for movement from a position completely exterior to the magazine to a position penetrating a selected compartment within the magazine, which position is achieved by clockwise movement of the lever member 62 from the exterior position pictured in FIG. 4. Each compartment of the magazine preferably includes a locking lever 64. When the transfer lever member 62 penetrates a selected compartment, it engages the locking lever 64 therein and causes the locking lever 64 to pivot and move a record within the compartment toward the loading position within the loading/reproducing mechanism 24. For a detailed description of a magazine having locking levers of the type described, reference is made to copending application Ser. No. 662,271, filed Oct. 18, 1984, and entitled "Storage Device For Record Disc". The locking lever 64 in each compartment is provided to transfer a record from a magazine compartment upon pivotal movement in one direction and to lock a record in the compartment upon reverse movement, and the locking lever is actuable by external means, herein shown as the transfer lever member 62.

In the preferred embodiment, the loading/reproducing mechanism 24 is operative to displace the record from the loading position in one plane to an operating or playing position in a parallel plane and preferably is the type of mechanism disclosed in detail in U.S. Pat. No. 4,513,409. This mechanism employs a support (not shown in FIG. 4) which is rotatably mounted in the loading/reproducing mechanism 24 and travels in a helicoidal motion to transfer the record from the plane of the loading position to the parallel plane of the operating or playing position.

For the purpose of actuating the locking lever 64 in a selected compartment of the magazine 22 by means of the transfer lever member 62, the transfer lever member 62 is movable by a motor 66 which is supported on the lateral extension 60 of the movable chassis 42. The motor 66 is connected to the transfer lever member 62 through a reduction gear drive 68 and a gear segment 70 which is fixed to the transfer lever member 62. The end of the transfer lever member 62 is operable to penetrate a side wall of a selected compartment and engage a locking lever 64 pivotally mounted within that compartment. Since the selected compartment may vary from the bottom to the top of the magazine 22 depending on the angular position of the magazine, the transfer lever member 62 is pivotally mounted on the lateral extension 60 of the movable chassis 42 and is rigidly fastened thereto so as to move with the movable chassis 42 as it pivots about its axis 28. The mounting of the transfer lever member 62 on the lateral extension 60 is pictured in FIG. 4 which, in plan view, shows the lateral extension 60 outside the fixed frame 30 and connected to the movable chassis 42 supporting the loading/reproducing mechanism 24 through a shaft 72 so that the lateral extension 60 and the movable chassis 42 pivot in unison between the extreme positions pictured for the chassis in FIGS. 3a and 3b, respectively.

Figure 3A:
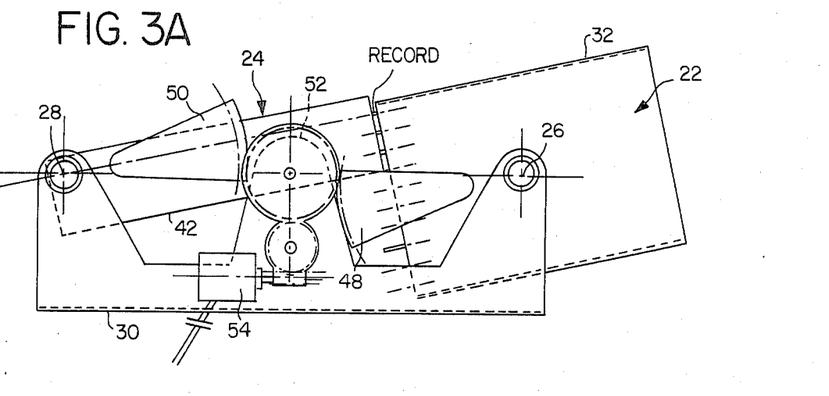
FIGS. 3a and 3b are further diagrammatic side views of a changer apparatus according to the invention with the magazine and loading/reproducing mechanism shown at different positions.
Figure 3B:
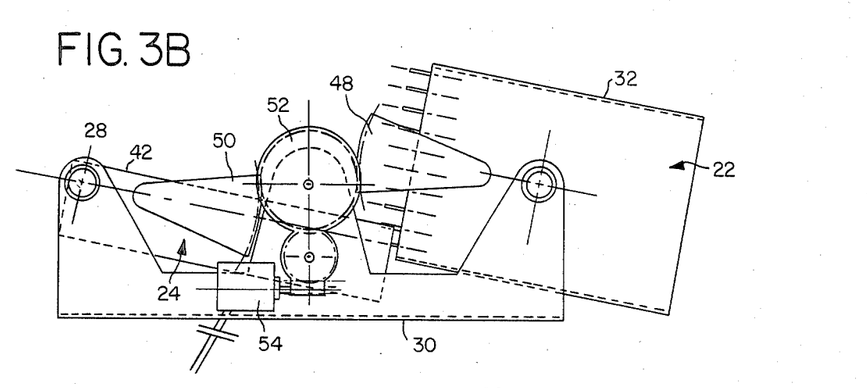

It will be seen from FIGS. 3a and 3b that, at the extreme positions of the movable chassis 42 and the loading/reproducing mechanism 24 carried thereby, the loading/reproducing mechanism 24 faces the end compartments of the magazine 22, and this alignment of the storage plane P1 with the loading plane P2 allows a record in an end compartment to be transferred to the loading/reproducing mechanism or to be returned from the loading/reproducing mechanism to the same compartment in the magazine. Between the extreme positions and at each of the intermediate positions, the loading/reproducing mechanism 24 will be aligned with one of the compartments to receive a record therefrom. The magazine 22 is positionable at intermediate positions corresponding to the magazine compartments. With the lateral extension 60 of the movable chassis 42 pivoting in unison with the loading/reproducing mechanism 24, the transfer mechanism 58 and transfer lever member 62 carried by the lateral extension 60 are also located immediately adjacent a selected compartment.

It will also be seen in FIGS. 3a and 3b that the movement of the movable chassis 42 carrying the loading/reproducing mechanism 24 and the housing 32 for the magazine 22 is coordinated such that they swing in opposite directions. The power to produce this swinging motion of the changer components is provided by the motor 54 which is connected to the segments 48, 50 on the movable chassis 42 and the housing 32 by the drive gear 52 meshing with the two segments 48, 50, respectively.

Also connected to the movable chassis 42 is an optical reading device 78 in the form of a diodephototransistor adapted to detect optical information, which may be in the form of bars, depressions, reflecting area, etcetera, carried by the housing 32 of the magazine 22. These items of information correspond to the center of each compartment with the magazine and enable the loading/reproducing mechanism 24 and the transfer mechanism 58 to be very precisely aligned with the center of the compartment in which the record selected by the user is situated.

OPERATION

For facility of use and, in particular, in order to permit easy insertion or removal of the magazine 22 relative to its housing 32, provision is made for the housing 32 and the magazine 22 to be automatically brought into a horizontal position for these operations, as shown in FIGS. 3 and 4.

For this purpose, the optical coating comprises an additional item of information 76, opposite the central compartment (the fifth compartment in the present case), this item of information 76 being detected by an optical reading device 78 similar to a device 80 for reading information 82 representing the positions of the individual compartments.

The readout signal is then transmitted to a microprocessor 84 of the control system pictured in FIG. 5, and this microprocessor retains, in one of its storage memories, the fact that the central compartment is opposite the loading/reproducing mechanism 24. By convention, compartment 1 may be the one situated at the top, as illustrated in FIG. 3a, and compartment 10 may be the one at the bottom, as pictured in FIG. 3b, facing the loading/reproducing mechanism 24. Thus, when a user selects a record and, hence, the corresponding compartment by means of a control keyboard 86 connected to the microprocessor 84, the microprocessor compares the number fed in with that stored and, depending on the result of this comparison, operates the motor 54 to rotate, clockwise or counterwise, depending on the sign of this comparison and the counting of the optical information and depending on the value of the difference obtained.

Thus, by means of the drive gear 52 and of the segments 48, 50, the motor 54 positions the loading/reproducing mechanism 24 facing the compartment containing the selected record.

The transfer mechanism motor 66 is then switched on by the program operating the microprocessor 84 and rotates the transfer lever member 62 which, by acting on the locking lever 64 within the compartment containing the selected record, transfers the record to the loading/reproducing mechanism 24.

The record is then introduced into the loading/reproducing mechanism which is automatically operated to transfer the record onto a drive spindle where it may be clamped in operating position.

Once the reproduction of the record is finished, the record is first disengaged from its drive means and brought to a position from which it may be transferred from the loading/reproducing mechanism and returned to its original compartment in the magazine 22.

As will be seen from FIG. 3, since the bulkiest part of the changer is the housing 32 containing the magazine 22, it is desirable that the movement of the magazine 22 for the selection of records be as restricted as possible to enable the largest possible number of records to be installed in a given space. For this reason, in the equipment described herein the center of pivoting of the housing containing the magazine is situated in the geometrical center thereof.

Thus, since the angular deviations of the housing and of the loading/reproducing mechanism should be precisely opposite in order to ensure the transfer of each record in its own plane, and since the loading/reproducing mechanism is small in bulk in comparison with the housing, the axis of pivoting of the loading/reproducing mechanism 24 has advantageously been placed close to its opposite end from the magazine housing 32 and, therefore, the axis of the drive gear 52 is equidistant between the two axes 26, 28 of pivotal motion of the magazine 22 and the loading/reproducing mechanism 24. Any variation may be made to this geometry to take special conditions into account, and, of course, other connections achieving the same object may be used. For example, it is possible to use gears connected by a rack which, given an alternating linear movement, would ensure the rotation of gears in opposite directions.

FIGS. 6–9:

An actual working unit illustrating the best mode of the invention is shown in FIGS. 6–9 whereas FIGS. 3 and 4 illustrate an embodiment of the invention diagrammatically.

Figure 6:
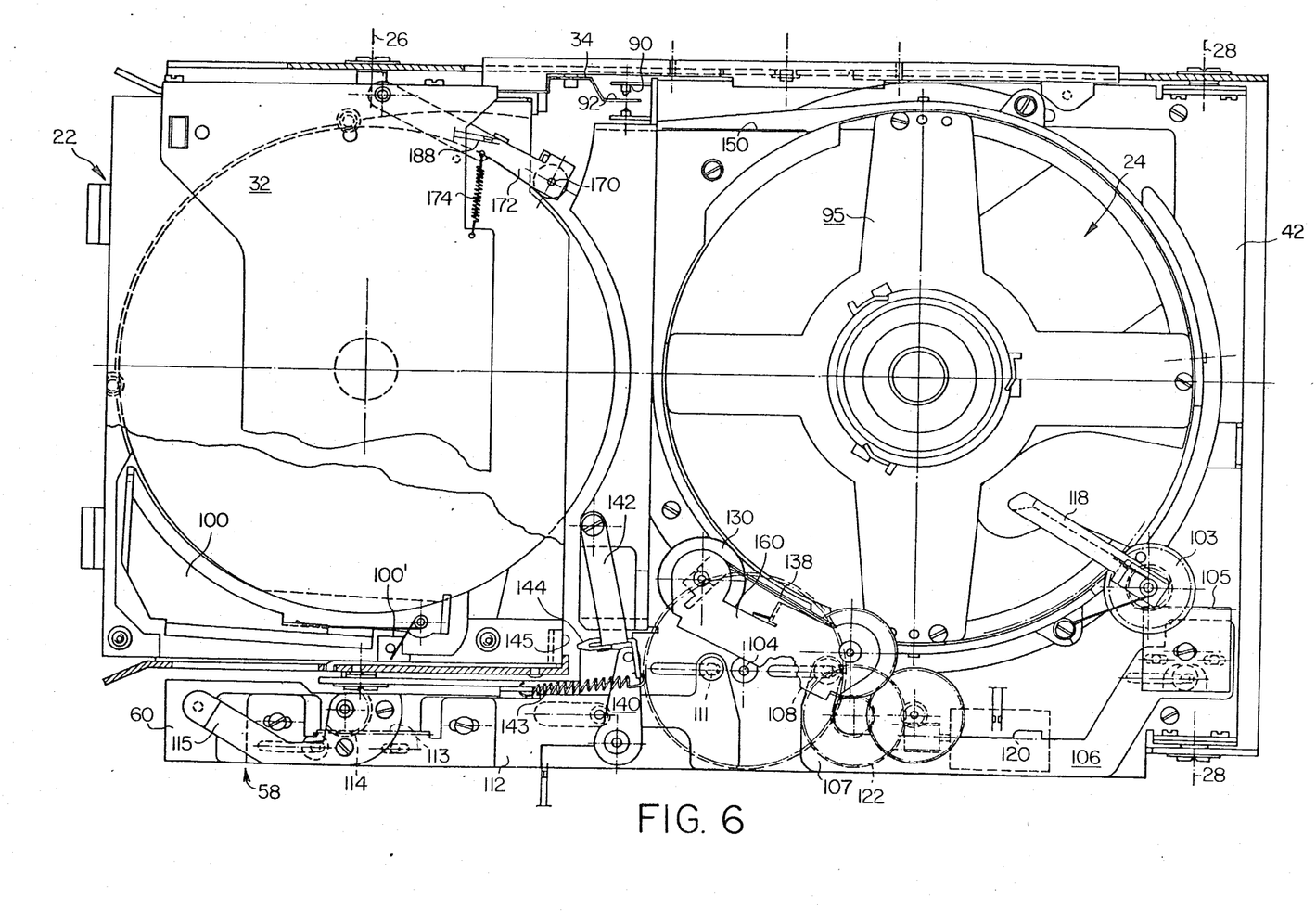
FIG. 6 is a top view of an actual working record changer unit embodying the invention and representing the best mode.
Figure 7:
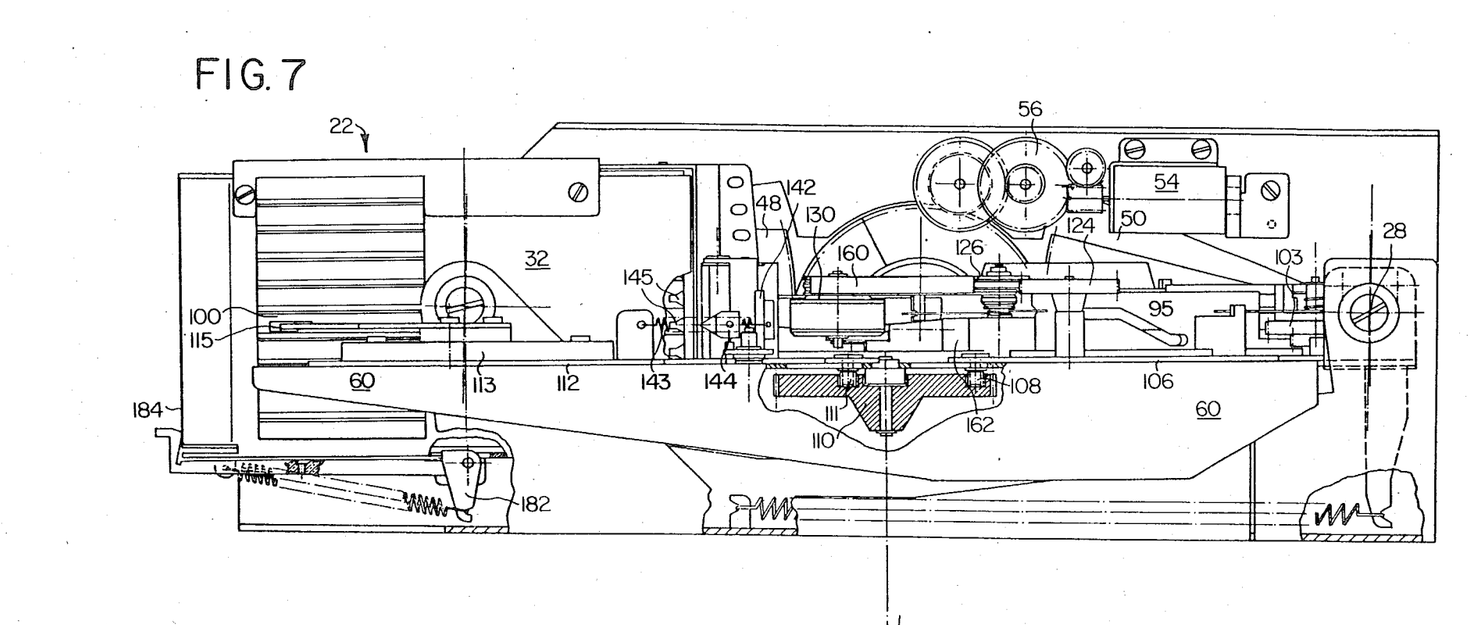
FIG. 7 is a side view of the unit shown in FIG. 6.
Figure 8:
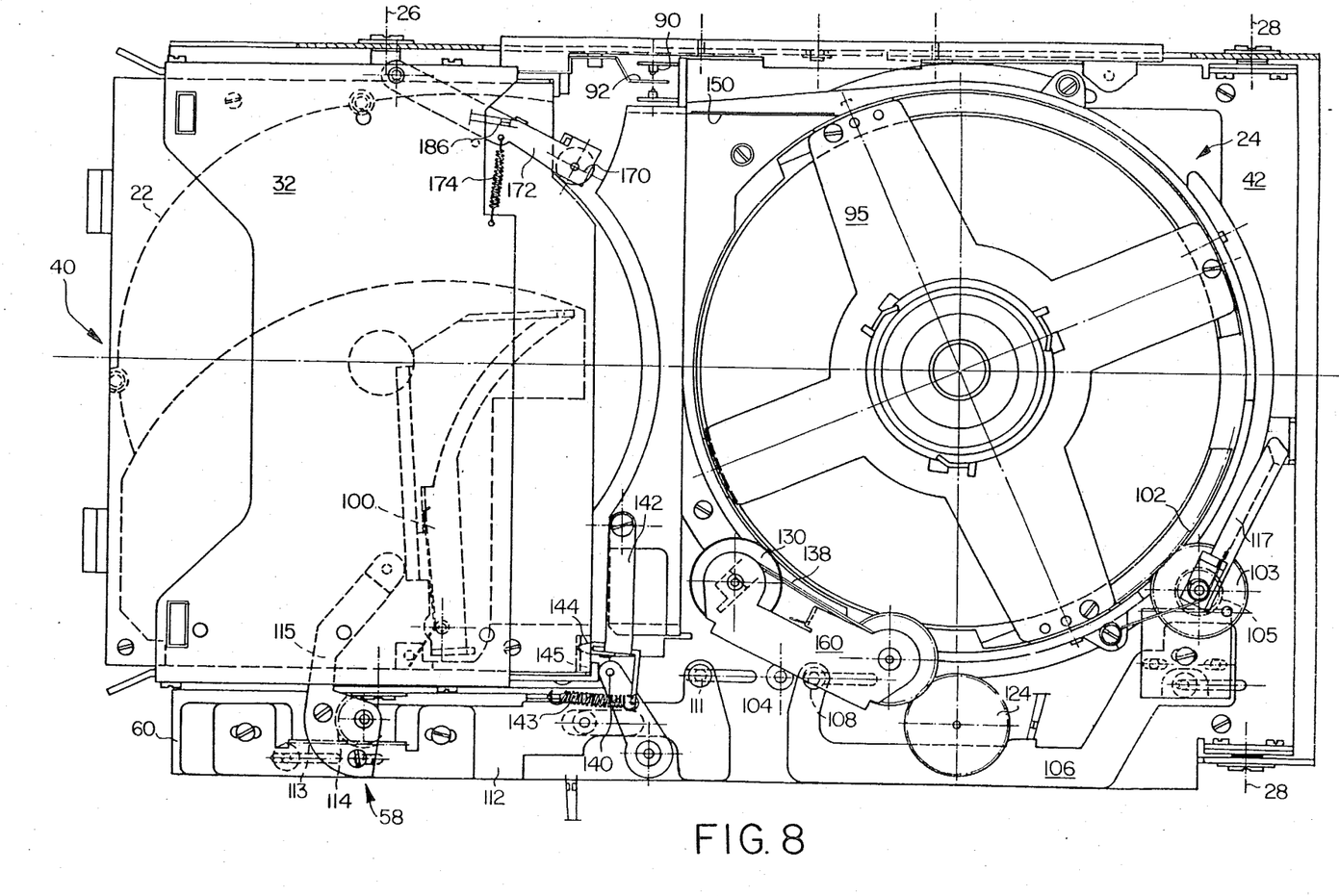

For illustration purpose, the changer is shown in plan view in FIG. 6, turned end-for-end from the plan view of FIG. 4. Thus, the loading/reproducing mechanism 24 is at the right end of the drawing in FIG. 6 while it is at the left end of the drawing in FIG. 4; the transfer mechanism 58 is at the bottom left hand corner of the drawing in FIG. 6 while it is at the upper right hand corner in FIG. 4. FIG. 7 is a side view of the changer as pictured in FIG. 6, and FIG. 8 is a plan view arranged similarly to FIG. 6. In FIG. 6, the records are in the magazine, while in FIG. 8 a record is shown in playing position in the loading/reproducing mechanism 24 after it has been transferred from a selected compartment.

In FIG. 7, the magazine housing 32 and loading/reproducing mechanism 24 are shown in horizontal position, to which they are brought automatically by the preferred control system, an optical reading device 90 being provided to detect an item of information 92 on a member 94 fixed to the magazine housing 32 that represents the horizontal position in which the central one of the compartments (the fifth compartment in this case) faces the loading/reproducing mechanism 24 (FIG. 6).

The loading/reproducing mechanism 24 is carried by a movable chassis 42 for pivotal movement about an axis 28 and carries a toothed segment 50 associated with a drive gear 52 actuated by a motor 54 through a reduction gear 56. As previously noted, it is preferred that the loading/reproducing mechanism 24 is in the form of a rotationally-mounted support 95 receiving a record and performing a helical movement to raise and lower the record from a loading plane to a parallel operating or playback plane, as described in U.S. Pat. No. 4,513,409.

In this preferred embodiment of the invention, a peripheral segment 102 of the rotationally mounted support 95 is engaged with a gear 103 freely mounted on the movable chassis 42 and driven by a toothed rack 105 which is longitudinally moved by means of a first actuating slide 106 for the loading/reproducing mechanism 24. The other end 107 of the first actuating slide 106 carries a pin 108 associated with a profile 109 cut in a control cam 110. This control cam 110 is rotatable and is supported on the movable chassis 42 which carries the loading/reproducing mechanism 24, the control cam 110 being driven under the direction of the control system to rotate the loading/reproducing mechanism support 95 and cause it to travel in a helicoidal path to shift the position of the record between the loading and playing positions.

Figure 9:
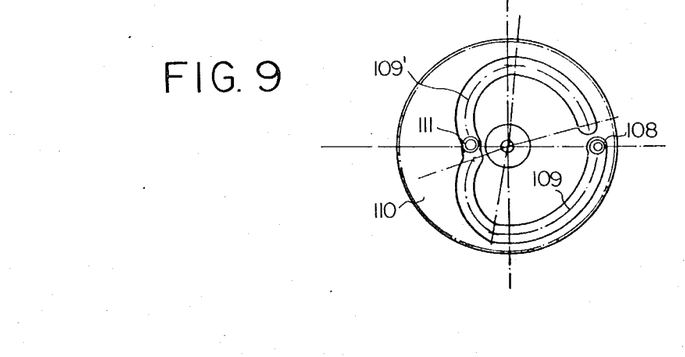
FIG. 9 shows details of a cam appearing in FIGS. 6-8.

This same control cam 110 is provided with a second profile 109' which is associated with a second actuating slide 112 for the record transfer mecahnism 58, and the control cam 110 moves the second actuating slide 112 by means of a pin 111. The record transfer actuating slide 112 at the end adjacent the magazine has a toothed segment 113. A lateral extension 60 of the movable chassis 42 extends adjacent the magazine housing 32 and supports the second actuating slide 112 and a gear 114 which is engaged by the toothed segment 113 on the slide 112. The gear 114 carries a transfer lever arm 115 of the transfer mechanism 58 intended to work jointly with levers 100 contained in the compartments of the magazine 22 and which serve both to transfer a record when actuated to pivot in one direction, or to lock the record in the respective compartment when released to pivot in the reverse direction under the force of the spring 100'.

The control cam 110 is rotated by a control motor 120 through reduction gear unit 122. This same control motor 120 rotates a transfer assist roller 130 located at the edge of the loading/reproducing mechanism support 95 for engagement with the periphery of a record upon its transfer into or out of the loading/reproducing mechanism, the roller 130 being operated through a gear and belt drive 138. This type of roller assist means is disclosed in detail in U.S. patent application Ser. No. 768,562, filed Aug. 23, 1985.

Means are also provided, mounted on the movable chassis and engageable with the magazine, to interlock the magazine and the loading/reproducing mechanism when a record is transferred from the magazine. For this purpose, the record transfer actuating slide 112 also includes a pin 140 mounted to engage an interlock lever 142 acted upon by a spring 143. This interlock lever 142 is provided with a pointed end 144 intended to penetrate into openings 145 cut in the edge of the magazine 22 in order to interlock the magazine 22 and the loading/reproducing mechanism 24 during the transfer and playback of a record. Thus, when the control motor 120 turns clockwise, the control cam 110 is rotated and, through the shape of the first and second profiles 109 and 109' cut therein, simultaneously ensures the displacement to the left of the record transfer actuating slide 112 and the clockwise rotation of the transfer roller 130.

Upon such displacement, the pin 140 releases the interlock lever 142 so that, under the action of the spring 143, the pointed end 144 of the interlock lever 142 enters into the opening 145 corresponding to the magazine compartment facing the loading/reproducing mechanism 24 at the particular intermediate location in which it is positioned by the control system. Consequently, the motor 54 for positioning the magazine 22 with respect to the loading/reproducing mechanism 24 may be deenergized. An interlock being performed, the toothed segment 113 engages with the gear 114 and the lever arm of the transfer mechanism and through clockwise swiveling penetrates the selected compartment and acts on the locking lever 100 within the compartment facing the loading/reproducing mechanism.

In each of the parallel compartments of the magazine, means are provided for storing a record in a storage plane P1, preferably a V-shaped support that carries the record solely at its periphery and guides it by such engagement, as disclosed in U.S. Pat. No. 4,510,591. The record which is stored therein is then moved toward the loading/reproducing mechanism. The record periphery comes into contact with the transfer roller 130, the contour of which imposes a rolling movement to the disc in association with a guiding face 150 on the loading/reproducing mechanism. The transfer roller 130 is mounted on a lever 160 and is acted on by a spring 162 to assist in the loading and unloading of the record on the support 95.

After a record has been fully inserted into the support 95 of the loading/reproducing mechanism 24, the first profile 109 of the control cam 110 actuates the displacement to the left of the loading/reproducing mechanism actuating slide 106 and the positioning gear 105 rotates the record support 95 which moves helicoidally and, by lowering, positions the record on its driving and playback means. It is held in place by a clamping device, preferably of the type described in U.S. Pat. No. 4,570,194.

After the supply to the control motor 120 is switched off, the playback or recording operations may take place.

When it is desired to return the record to its storage compartment in the magazine, the control motor 120 is switched on but with reversed polarity to make it turn in the reverse direction.

Consequently, the loading/reproducing mechanism actuating slide 106 is first moved to the right, causing, through the gear 103 and teeth 102 on the support 95, the record support 95 to be rotated and moved in a helicoidal path, raising the record from its operating plane in the loading/reproducing mechanism, while a lever 118 mounted on the intermediate support drive gear 103 is moved pivotally into engagement with the record to start its ejection. When the periphery of the record contacts the transfer roller 130, the roller 130 rolls the disc in the other direction to lead it towards the compartment of the magazine to which it is being returned. The transfer actuating slide 112 is then moved to the right and the record is brought back into storage position within the compartment. This movement is assisted by a roller 170, freely mounted on a lever 172 pivotally carried by the magazine housing 32 and acted on by a spring 174. The pin 140 then acts on the lever 142 to swivel it against its spring 143 which causes its pointed end 144 to be retracted from the opening 145 cut in the edge of the magazine. Consequently, the magazine 22 and the loading/reproducing mechanism 24, being unlocked, the control motor 54 can be switched on for the selection of another record.

While reference has been made herein to "reproducing" of information and "loading" of records for playing, it is intended that this terminology includes "recording" as well as reproducing and "unloading" as well as loading.

Safeties:

The illustrated control circuit in FIG. 5 controls power consumption of the motors 120, 58, ensuring, respectively, the transfer of a record and the positioning of the loading/reproducing mechanism and the magazine, and switches the unit to "stand-by" condition in case of over-consumption to avoid damage.

Pivotal movements of the magazine and the loading-/reproducing mechanism are permitted only when records are returned to their proper position inside the magazine, sensed by an electrical contact 188 on the roller arm 172.

The changer, although switched on, will not respond to control if a spring-biased lever 182 retaining the magazine is not in proper position or if the door 184 is not properly closed.

Other safeties, not detailed in the drawings, are provided.

I claim:

1. Record changer apparatus comprising:
a magazine for storing a plurality of records,
a playback/reproducing mechanism for receiving and playing or recording on a record transferred from said magazine,
means for transferring a record between said magazine and said playback/reproducing mechanism and vice versa,
means for mounting said magazine and said playback-/reproducing mechanism for pivoting about distinct axes, and
means for moving said magazine and said playback-/reproducing mechanism to produce coordinated opposite angular displacements thereof about their respective axes between different fixed positions in each of which said playback/reproducing mechanism is aligned with a different record in said magazine to allow transfer of a selected record therebetween when said mechanism and said magazine are located at one of the fixed positions.

2. Record changer apparatus according to claim 1 wherein said means for moving said magazine and said mechanism includes:
toothed members connected to said magazine and said mechanism, and
a common drive gear meshing with teeth of said members for producing opposite angular displacements of said magazine and said mechanism.

3. Record changer apparatus according to claim 1 including a movable housing mounted to pivot on said frame about one of the axes and receiving said magazine,
a movable chassis mounted to pivot on said frame about another of the axes and carrying said mechanism,
said axes being parallel,
said housing and said chassis being movable to produce opposite angular displacements of said magazine and said loading/reproducing mechanism between different fixed, postions, and
said transferring means including a transfer mechanism mounted on said movable chassis including means for penetrating the magazine to transfer a selected record from said magazine when said mechanism and said magazine are located at one of the fixed positions.

4. Record changer apparatus according to claim 1, said magazine having a box-like structure with a geometrical center, the one of the axes of pivotal movement of said housing coinciding with the geometrical center.

5. Record changer apparatus according to claim 4, the another of the axes of pivotal movement of said chassis extending adjacent a remote edge of said chassis relative to said magazine, said axes being parallel.

6. Record changer apparatus according to claim 1, said magazine having a plurality of parallel compartments for storing records, said apparatus including a box-like open-ended housing for receiving said magazine, said housing having a loading position for the introduction or extraction of the magazine in relation to the housing.

7. Record changer apparatus according to claim 1, said magazine having a plurality of parallel compartments for storing records,
a movable chassis for carrying said mechanism,
said mechanism having a support for receiving a record at a loading position in a loading plane,
said magazine and said mechanism being mounted so that at one of the fixed positions the compartments in the magazine and the support of the mechanism are horizontal, and one of the compartments is aligned with the support of the mechanism.

8. Record changer apparatus comprising:
a magazine having a a plurality of parallel compartments, each having means for storing a record in a storage plane,
a playback/reproducing mechanism for receiving and playing or recording on a record transferred from said magazine, said mechanism receiving a record in a loading plane, and
means for mounting said magazine and said mechanism for opposite angular pivotal displacements about respective parallel axes between a plurality of fixed positions and for coordinating the angular pivotal displacements to align the storage plane of a different one of the compartments with the loading plane of said mechanism at each of the fixed positions of said magazine and said mechanism to allow transfer of a record therebetween.

9. Record changer apparatus according to claim 8 wherein said means for coordinating the angular pivotal displacements of said magazine and said mechanism includes:
toothed members connected to said magazine and said mechanism, and
a common drive gear meshing with teeth of said members for producing opposite angular displacements of said magazine and said mechanism.

10. Record changer apparatus according to claim 8, said playback/reproducing mechanism having a rotatable support for receiving a record in a loading plane,
said magazine having a lever in each compartment for transferring a record from the compartment upon one movement and for locking the record in the compartment upon reverse movement, said apparatus including:
a transfer mechanism cooperating with the lever in a selected compartment of said magazine aligned with the support in said loading/reproducing mechanism,
a control cam including two profiles,
first and second slides associated respectively with the cam profiles, and
means connecting said first slide to rotate the support of said loading/reproducing mechanism for loading and unloading a record relative to a playing position, and means connecting said second slide to actuate said transfer mechanism for transferring a record from and for locking the record in the selected compartment.

11. Record changer apparatus according to claim 10 including:
a movable chassis carrying said loading/reproducing mechanism, and
means for mounting said control cam, first and second slides, connecting means, and transfer mechanism on said movable chassis.

12. Record changer apparatus according to claim 10 including a record assist roller means positioned adjacent the support for engagement with the periphery of a record upon its transfer from the magazine to the playback/reproducing mechanism and vice versa, and
a motor connected and controlled to drive said control cam and said record assist roller means to transfer a selected record between said magazine and said loading/reproducing mechanism.

13. Record changer apparatus according to claim 8 including:
a movable chassis carrying said playback/reproducing mechanism, and
means mounted on the chassis and engageable with said magazine at each of the fixed positions to interlock said magazine and said playback/reproducing mechanism when a record is transferred from the magazine.

14. Record changer apparatus according to claim 13 including a transfer mechanism mounted on said movable chassis to transfer a selected record from said magazine to any one of the fixed positions, and
common means for actuating said transfer mechanism and said means to interlock the magazine and the playback/reproducing mechanism.

15. Record changer apparatus according to claim 14 wherein said common means includes a control cam, and said means to interlock said magazine and said playback/reproducing mechanism includes a movable member mounted on a pivoting lever, a spring acting to pivot said lever in one direction to engage the interlock, and means including a pin actuated by said control cam to pivot said lever against the force of said spring in the opposite direction to disengage the interlock.

16. Record changer apparatus according to claim 8 including a movable housing mounted to pivot on said frame about one of the axes and receiving said magazine.

* * * * *